United States Patent
deLéon et al.

(10) Patent No.: US 7,416,099 B2
(45) Date of Patent: Aug. 26, 2008

(54) NECK STRAP FOR MOBILE ELECTRONIC DEVICE

(75) Inventors: Rodolfo deLéon, Malmö (SE); Bilgi Karan, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 228 days.

(21) Appl. No.: 11/244,565

(22) Filed: Oct. 6, 2005

(65) Prior Publication Data

US 2007/0080186 A1  Apr. 12, 2007

(51) Int. Cl.
  *A45B 11/02* (2006.01)
(52) U.S. Cl. .................................... 224/600; 224/188
(58) Field of Classification Search ............... 224/600, 224/188, 578; 455/568
  See application file for complete search history.

(56) References Cited

U.S. PATENT DOCUMENTS

| | | | |
|---|---|---|---|
| 2,676,738 A * | 4/1954 | Herrick | 224/638 |
| 6,847,724 B1 | 1/2005 | Weng et al. | 381/370 |
| 7,174,196 B2 * | 2/2007 | Matsuda | 455/575.6 |
| 2002/0065115 A1 * | 5/2002 | Lindholm | 455/568 |
| 2003/0142817 A1 | 7/2003 | Liao | 379/428.01 |
| 2005/0274755 A1 * | 12/2005 | Lee et al. | 224/255 |

FOREIGN PATENT DOCUMENTS

| | | | |
|---|---|---|---|
| GB | 2376868 A | | 12/2002 |
| JP | 2001-137035 A | | 5/2001 |
| JP | 2001137035 A | * | 5/2001 |
| JP | 2001204534 A | * | 7/2001 |
| JP | 2001237939 A | * | 8/2001 |
| JP | 2005-168071 A | | 6/2005 |
| WO | WO03/103255 A1 | | 12/2003 |

* cited by examiner

*Primary Examiner*—Nathan J Newhouse
*Assistant Examiner*—Lester L Vanterpool
(74) *Attorney, Agent, or Firm*—Myers Bigel Sibley & Sajovec PA (57) ABSTRACT

A neck strap for a mobile electronic device, includes a flexible loop arrangeable around the neck of a user and a connector whereby said flexible loop is connectable to said mobile electronic device. Furthermore, one section of said flexible loop includes at least one securing element, whereby a cable is securable to said at least one section of the flexible loop. In this way, a cable, such as an earphone cable, may be secured to the flexible loop, thereby organizing the cable and reducing tangling of the cable.

8 Claims, 7 Drawing Sheets

NECK STRAP FOR MOBILE ELECTRONIC DEVICE

FIELD OF THE INVENTION

The current invention relates to accessories for mobile electronic devices, and in particular to a neck strap for a mobile electronic device.

BACKGROUND OF THE INVENTION

Neck straps for mobile electronic devices usually comprise a flexible loop which is arrangeable around the neck of a user, and a connector whereby the flexible loop is connectable to the mobile electronic device. Two typical, but not exclusive, examples of mobile electronic devices used with such neck straps are mobile telephones and music players, such as an MP3 player.

The neck strap allows the user to "hang" their mobile electronic device about his or her neck via the neck strap. This allows the user to carry the device without needing to use his or her hands. As is often the case, some sort of interface device, such as earphones or a microphone are connected to the mobile electronic device with a cable. It is often difficult to keep this cable from tangling with the neck strap when not in use. In addition, the presence of both the neck strap and a cable gives the electronic device an untidy and unorganized impression. Furthermore, the interface device, such as the earphones, can be difficult for the user to locate due to the long and disorganized cable.

One typical way for keeping cables from interface devices, such as earphones organized is with the use of a cable drum. One example of such a cable drum is shown in U.S. Patent Publication No. 2003/142817. However, the cable drum is an extra device which the user must keep track of an carry around.

Another device for keeping earphones and a neck strap organized is shown in U.S. Pat. No. 6,847,724. The neck strap shown in U.S. Pat. No. 6,847,724 shows a device in which a drum mechanism is built into the housing of a mobile electronic device. The drum mechanism can roll the neck strap into the housing. The earphones are located in a pouch on the end of the neck strap. However, due to the presence of the drum in the housing, the mobile electronic device becomes quite bulky. In addition, the cables can still get tangled when they are placed in the pouch on the strap.

SUMMARY

A neck strap for a mobile electronic device according to some embodiments of the invention may provide means for organizing cables connected to the mobile electronic device.

Furthermore, a neck strap for a mobile electronic device according to some embodiments of the invention may not increase the size of the mobile electronic device.

According to some embodiments of the invention, at least one section of a flexible loop includes at least one securing element, whereby a cable is securable to the at least one section of the flexible loop. In this way the cable can be connected to the flexible loop, thereby reducing and/or preventing tangling of the cable. In addition, the accessory connected to the cable can be arranged in a well-defined position.

In some embodiments, the cross section of the at least one securing element can have a recess which is engageable with the cable. The recess could otherwise be engageable with a corresponding protrusion on the cable. These embodiments may provide for a well defined connection between the cable and the flexible loop.

In some embodiments, the recess can be essentially C-shaped and can have an inner diameter which is essentially the same as an outer diameter of the cable. These embodiments may provide for a simple arrangement in which the cable can be directly tucked into the recess on the flexible loop.

In order to simplify the device, the securing element can be integrated into the flexible loop along said at least one section.

The neck strap could also comprise a sliding element slideably arranged on the flexible loop, whereby motion of the sliding element in a first direction engages the cable with the securing element and whereby motion of the sliding element in a second direction disengages the cable from the securing element. In this way, the user can easily connect and/or disconnect the cable from the neck strap.

In some embodiments, the sliding element can have a first channel arrangeable on the flexible loop and a second channel which is engageable with the cable, wherein the first channel and the second channel merge at an angle. This provides for a sliding element which is simple to manufacture and simple to use.

In some embodiments, the cable may include at least one earphone at an end thereof, whereby the end of the cable opposite the earphones is connected to the connector, and at least a portion of the earphone cable is arranged within the neck strap. This provides for a convenient neck strap for use with devices which have audio output such as mobile telephones, MP3 players, and the like.

BRIEF DESCRIPTION OF THE DRAWINGS

The invention will now be explained in more detail with reference to a number of exemplary embodiments according to the invention, which are illustrated in the accompanying figures. The embodiments are shown as examples only and are not intended to limit the scope of the invention. In the drawings.

DETAILED DESCRIPTION OF EMBODIMENTS OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items. The common abbreviation "e.g.", which derives from the Latin phrase "exempli gratia," may be used to introduce or specify a general example or examples of a previously mentioned item, and is not intended to be limiting of such item.

Relative terms such as "below" or "above" or "upper" or "lower" or "horizontal" or "vertical" may be used herein to describe a relationship of one element, feature or region to another element, feature or region as illustrated in the figures. It will be understood that these terms are intended to encompass different orientations of the device in addition to the orientation depicted in the figures.

It will also be understood that when an element is referred to as being "connected" to another element, it can be directly connected to the other element or intervening elements may be present. In contrast, when an element is referred to as being "directly connected" to another element, there are no intervening elements present. It will also be understood that the sizes and relative orientations of the illustrated elements are not shown to scale, and in some instances they have been exaggerated for purposes of explanation. Like numbers refer to like elements throughout.

FIGS. 1-4 show a neck strap 1 for a mobile electronic device according to some embodiments of the invention. The neck strap 1 includes a flexible loop 2, a connector 3, two earphones 4a,4b, two earphone cables 5a,5b, and two sliding element 6a,6b.

A mobile electronic device 7 may be connected to the flexible loop 2 of the neck strap 1 via the connector 3 and is drawn in dashed lines. The connector 3 may also serve to establish an electrical connection between the earphone cables 5a,5b and the mobile electronic device in some embodiments of the invention. The mobile electronic device 7 in this case could for example be a mobile telephone.

Figure 13:
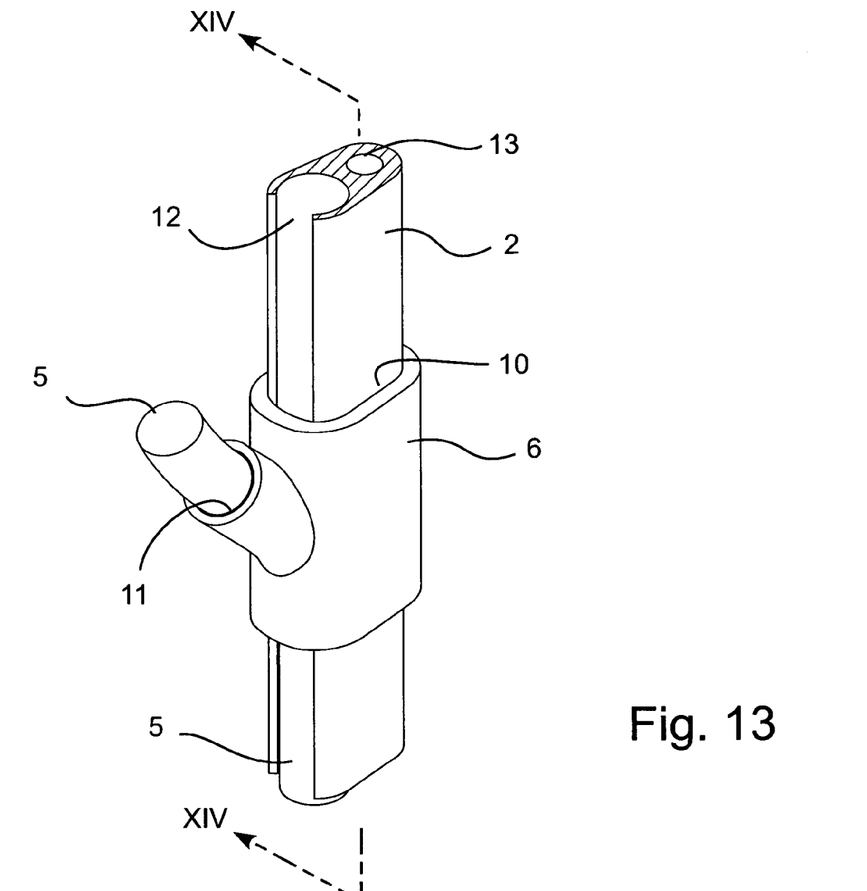
FIG. 13 shows a detail view of some embodiments of the flexible loop element of a neck strap and a sliding element mounted thereon.
Figure 14:
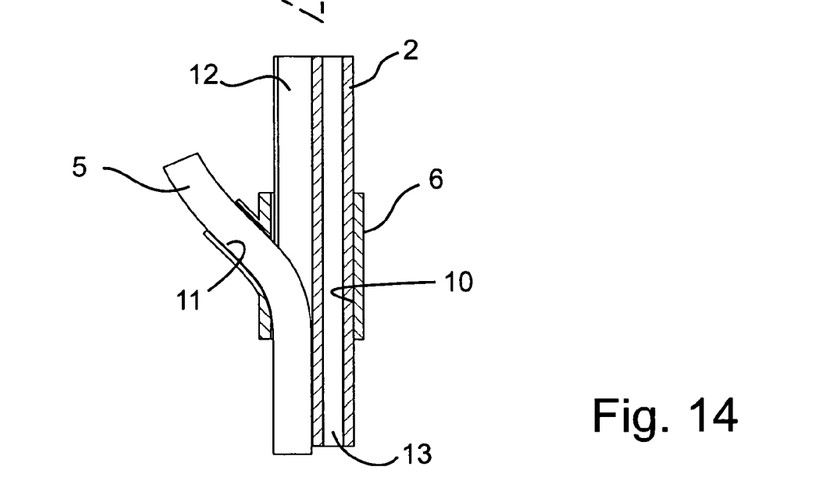
FIG. 14 shows a section view according to the section line XIV-XIV defined in FIG. 13.

The flexible loop 2 may, for example, be made from an extruded plastic material with a constant cross section. A more detailed view of a flexible loop 2 according to some embodiments of the invention is shown in FIGS. 13 and 14. The material of the flexible loop 2 may be flexible such that it can be formed into a loop which can be arranged around the neck of a user.

Referring to the embodiments of FIGS. 13 and 14, a flexible loop 2 of some embodiments has a recess 12 which is essentially C-shaped. The recess 12 is roughly circular in shape and has an inner diameter which is essentially the same as an outer diameter of the earphone cables 5a,5b. In this way, it is possible for an earphone cable 5a,5b to be pressed into the recess 12 of the flexible loop 2. The cross section of the flexible loop 2 furthermore has a hole 13 which forms a channel in the flexible loop element 2. This channel 13 can be used to store a section of the earphone cable 5a,5b as will be described later.

Referring again to the embodiments of FIGS. 1-4, the flexible loop 2 includes a single extruded flexible plastic element which forms the entire flexible loop 2. However, the flexible loop could be formed in many different ways. For example, a soft cloth strap could be used as the loop and an extruded plastic element, similar to that shown in FIGS. 13 and 14, could be attached to the cloth strap along certain sections.

In the embodiments illustrated in FIGS. 1-4, the two sliding elements 6a,6b are arranged to be independently slideable on the flexible loop 2. In this way, they can be slid along the flexible loop 2. This can be seen by comparing the positions of the sliding elements 6a,6b in FIGS. 1 and 3.

The sliding elements 6a,6b, have a roughly Y-shaped form. FIGS. 13 and 14 show the sliding elements 6a,6b in more detail. As illustrated therein, in some embodiments, the sliding elements 6a,6b include a first channel 10 with a cross section which has essentially the same dimensions as the cross section of the flexible loop 2. In this way, the sliding element 6 can slide on the flexible loop 2.

The sliding element 6 furthermore has a second channel 11 which merges at an angle with the first channel 10. The second channel 11 has a cross section which is essentially the same as the cross section of the earphone cables 5. The earphone cable 5 can therefore be slideably arranged inside the second channel 11.

Due to this arrangement, when the sliding element 6 is moved in an upwards direction, with reference to FIGS. 13 and 14, the earphone cable 5 is pressed into the recess 12 on the flexible loop as the angle of the second channel 11 urges the cable 5 into the recess 12. When the sliding element 6 is moved in a downwards direction, the earphone cable is removed from the recess 12 in the flexible loop as the angle of the second channel 11 urges the cable 5 out of the recess 12.

Figures 1, 2:
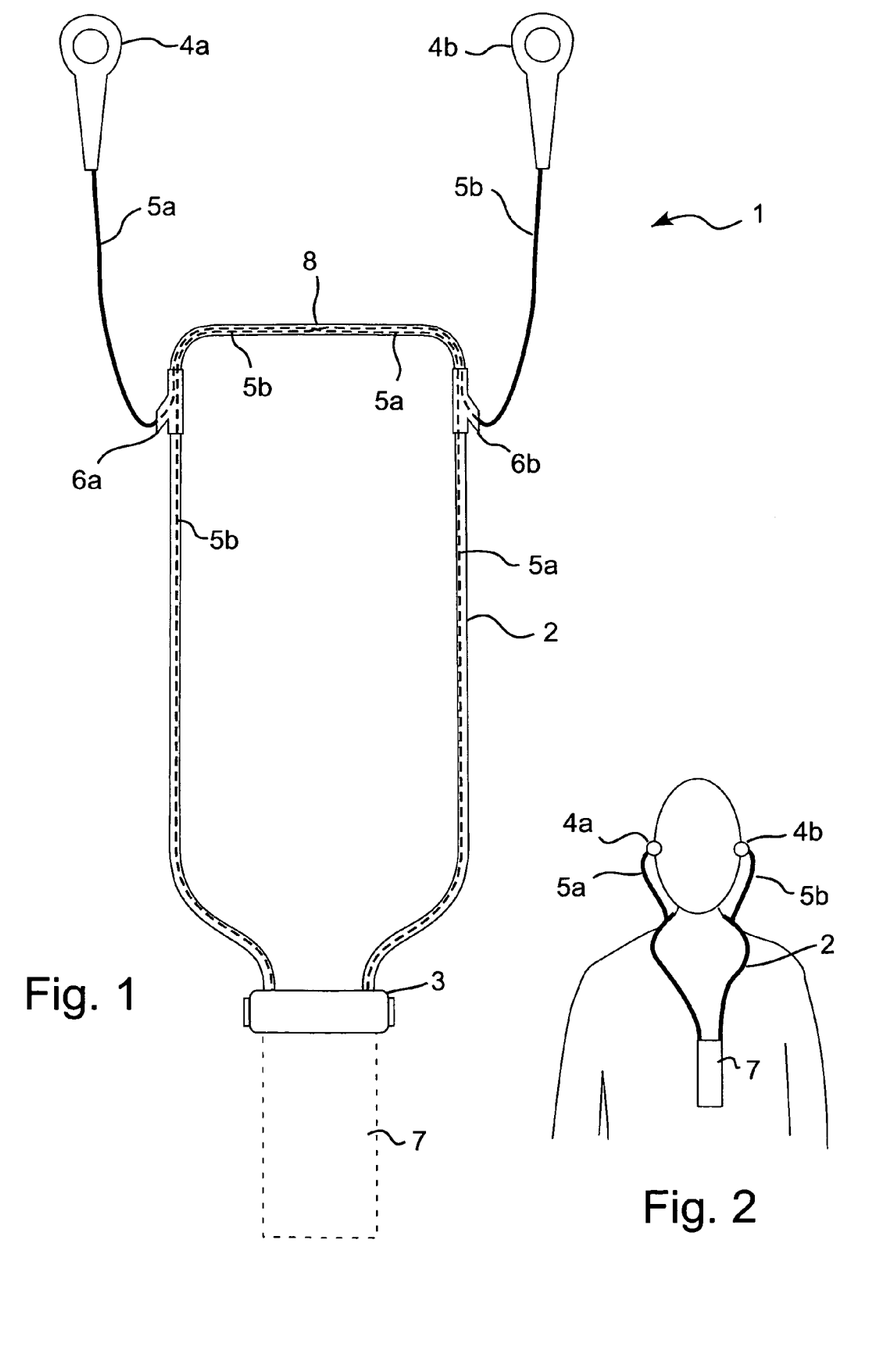
FIG. 1 shows a neck strap according to some embodiments of the invention in an "active" position where a set of earphones are in use.
FIG. 2 schematically shows a person wearing the neck strap of FIG. 1.
Figures 3, 4:
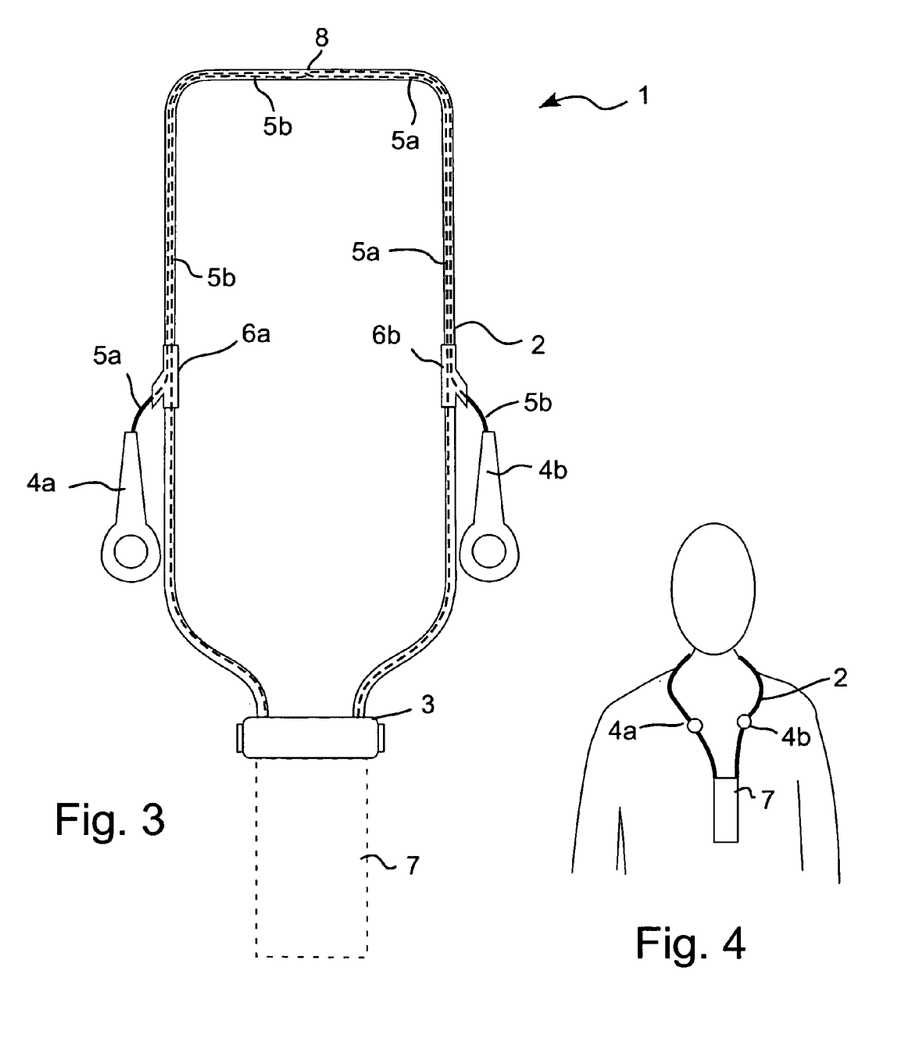
FIG. 3 shows a neck strap according to some embodiments of the invention in a "storage" position where the earphone cables are stored within the neck strap.
FIG. 4 schematically shows a person wearing the neck strap of FIG. 3.

With reference to FIGS. 1 and 3, it can be seen that in this embodiment the earphone cable 5a which is associated with the left earphone 4a is connected to the rightmost side of the connector 3. On the right side of the flexible loop, the left earphone cable 5a is arranged on the inner channel 13 of the flexible loop 2. At the center point 8 of the flexible loop 2, the left earphone cable 5a changes from the inner channel 13 to the open recess 12 in the flexible loop. The right earphone cable 5b, is the opposite. Its end is connected to leftmost side of the connector 3 and is arranged in the inner channel 13 on the left side of the flexible loop. As with the left earphone cable 5a, the right earphone cable 5b changes from the inner channel 13 to the open recess 12 at the center point 8 of the flexible loop 2.

Some methods of using the above described neck strap 1 will be described with reference to FIGS. 1-4. When the user is finished with using the earphones 4a,4b, and wishes to put them in their "storage" position, the user slides the sliding elements 6a,6b downwards on the flexible loop 2 thereby arranging the earphone cables 5a,5b inside the recess 12 on the flexible loop 2. This "storage" position is shown in FIGS. 3 and 4. When the user wishes to use the earphones 4a,4b, the user slides the sliding elements 6a,6b upwards on the flexible loop 2, thereby removing the earphone cables 5a,5b from the recess 12 in the flexible loop 2 and putting them into their "active" position. This position is shown in FIGS. 1 and 2. It should be mentioned, that the user can also pull directly on the cables, thereby causing the sliding elements to slide upwards on the flexible loop. This allows the user to quickly move the earphone cables from their storage position to their active position.

When the earphone cables 5a,5b are in the "storage" position, the earphone cables 5a,5b are neatly stored in the recess 12 of the flexible loop 2 and the earphones 4a,4b are easily accessible in a well defined position.

In the above description and in the figures, each of the sliding elements 6a,6b is described and shown as a single element. However, the sliding element could be formed in many different ways. For example, the sliding element could be split in half along its axis of symmetry. The resulting two symmetrical parts could be arranged such that they could be "snapped" together. In this way, the sliding part could more easily be assembled together with the flexible loop and the earphone cable. Another example, is an example where the sliding element does not fully enclose the flexible loop, but where a part of the sliding element is slideably engaged with a track on the flexible loop 2.

FIGS. 5-8 show a neck strap 20 according to further embodiments of the invention. Some elements of the neck strap 20 are similar to the parts of the first embodiment 1 shown in FIGS. 1-4, but they have been arranged in a different way.

According to the embodiments illustrated in FIGS. 5-8, the sliding elements 6a,6b of a neck strap 20 are arranged opposite to the way they were arranged in the embodiments illustrated in FIGS. 1-4 relative to the orientation of the neck strap on the user's neck. In this way, when the sliding elements 6a,6b are moved in a downwards direction, the earphone cables 5a,5b are removed from the open recess 12 in the flexible loop 2. When the sliding elements 6a,6b are moved in an upwards direction, the earphone cables 5a,5b are arranged inside the open recess 12 in the flexible loop 2.

Figures 5, 6:
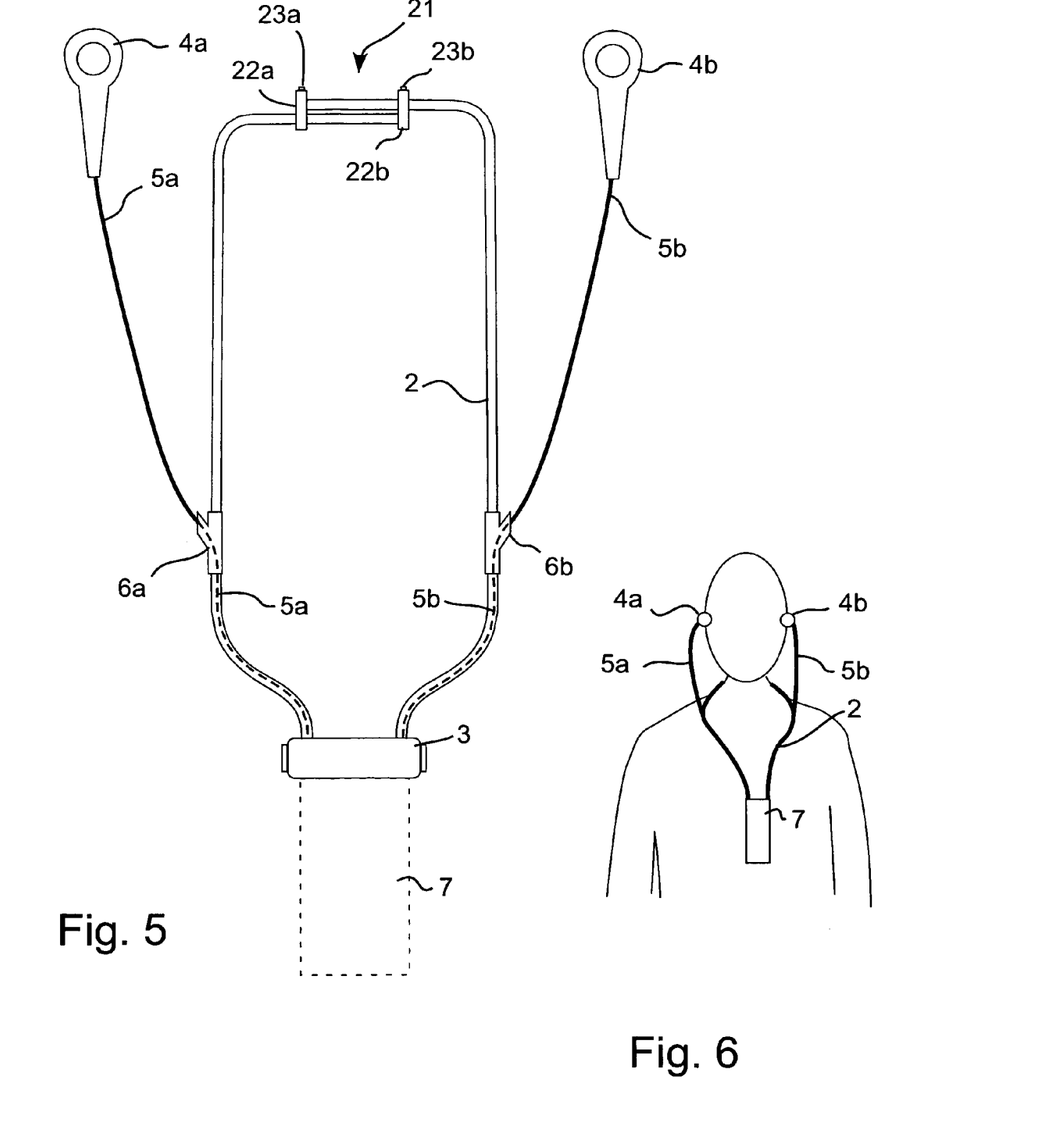
FIG. 5 shows a neck strap according to further embodiments of the invention in an "active" position where a set of earphones are in use.
FIG. 6 schematically shows a person wearing the neck strap of FIG. 5.
Figures 7, 8:
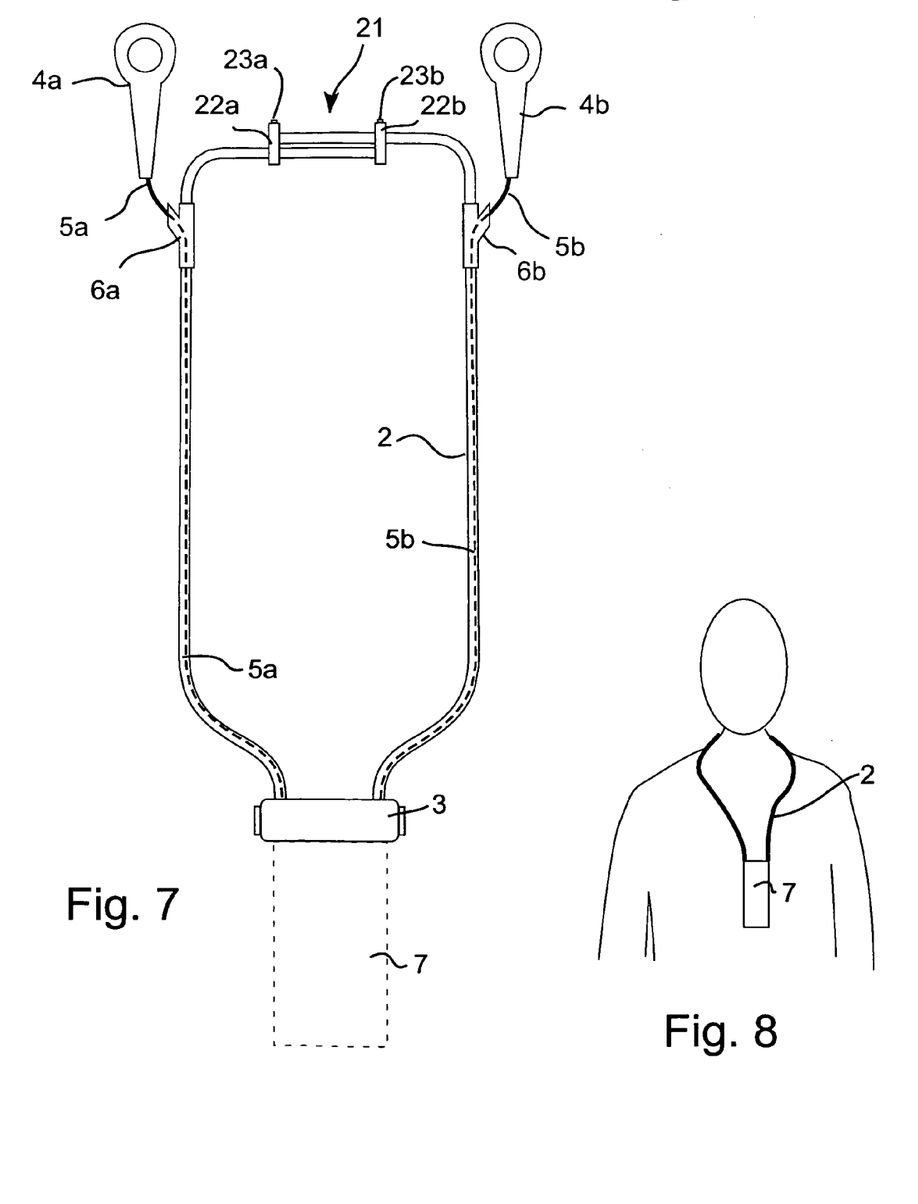
FIG. 7 shows a neck strap according to further embodiments of the invention in a "storage" position where the earphone cables are stored within the neck strap.
FIG. 8 schematically shows a person wearing the neck strap of FIG. 7.

FIGS. 5 and 6 show the earphones in their "active" position, and FIGS. 7-8 show the earphones in their "storage" position. As can be seen from FIG. 8, when the earphones are in their "storage" position, they are arranged behind the head of the user. Therefore they are completely out of the way and out of sight. This results in a streamlined appearance.

As can be seen from FIGS. 5 and 7, the earphone cables 5a,5b are arranged slightly differently than in the embodiments of FIGS. 1-4. In the embodiments of FIGS. 5-8, the left earphone cable 5a is connected on the leftmost side of the connector 3 and the right earphone cable 5b is connected on the rightmost side of the connector 3. In this way, the earphone cables 5a,5b can be completely maintained in the open recess 12 in the flexible loop 2. The inner channel 13 in the flexible loop 2, can therefore be neglected, or could be used for another accessory, for example a microphone cable or the like.

The neck strap 20 also includes a length adjustment device 21 on the flexible loop 2. The length adjustment device 21 includes two locking elements 22a,22b attached to each their end of the flexible loop 2. Each locking element 22a,22b has a spring loaded button 23a,23b which when pressed allows the locking element 22a,22b to slide on the flexible loop 2. In this way, the overall length of the flexible loop 2 can be adjusted. By displacing the locking elements 22a,22b away from each other, the dimension of the loop 2 is reduced. By displacing the locking elements 22a,22b towards each other, the dimension of the loop 2 is increased.

FIGS. 9-12 show a neck strap 30 according to still further embodiments the invention. The flexible loop 2 and the sliding element 6 of the embodiments illustrated in FIGS. 9-12 are similar to the ones used in the embodiments of FIGS. 1-8.

One difference between the embodiments of FIGS. 1-8 and the embodiments of FIGS. 9-12 is that the earphone cables 31 and earphones 32 are not an integrated part of the neck strap 30. In this way, it is possible for a user to use their own earphones 32a,32b with the neck strap according to some embodiments of the current invention.

The end of the earphone cable 31 which is opposite the earphones 32a,32b protrudes from the recess 12 in the flexible strap 2 near the connector 3 and is equipped with a plug 33 which can be engaged with the earphone port (not shown) of the mobile electronic device 7.

Figures 9, 10:
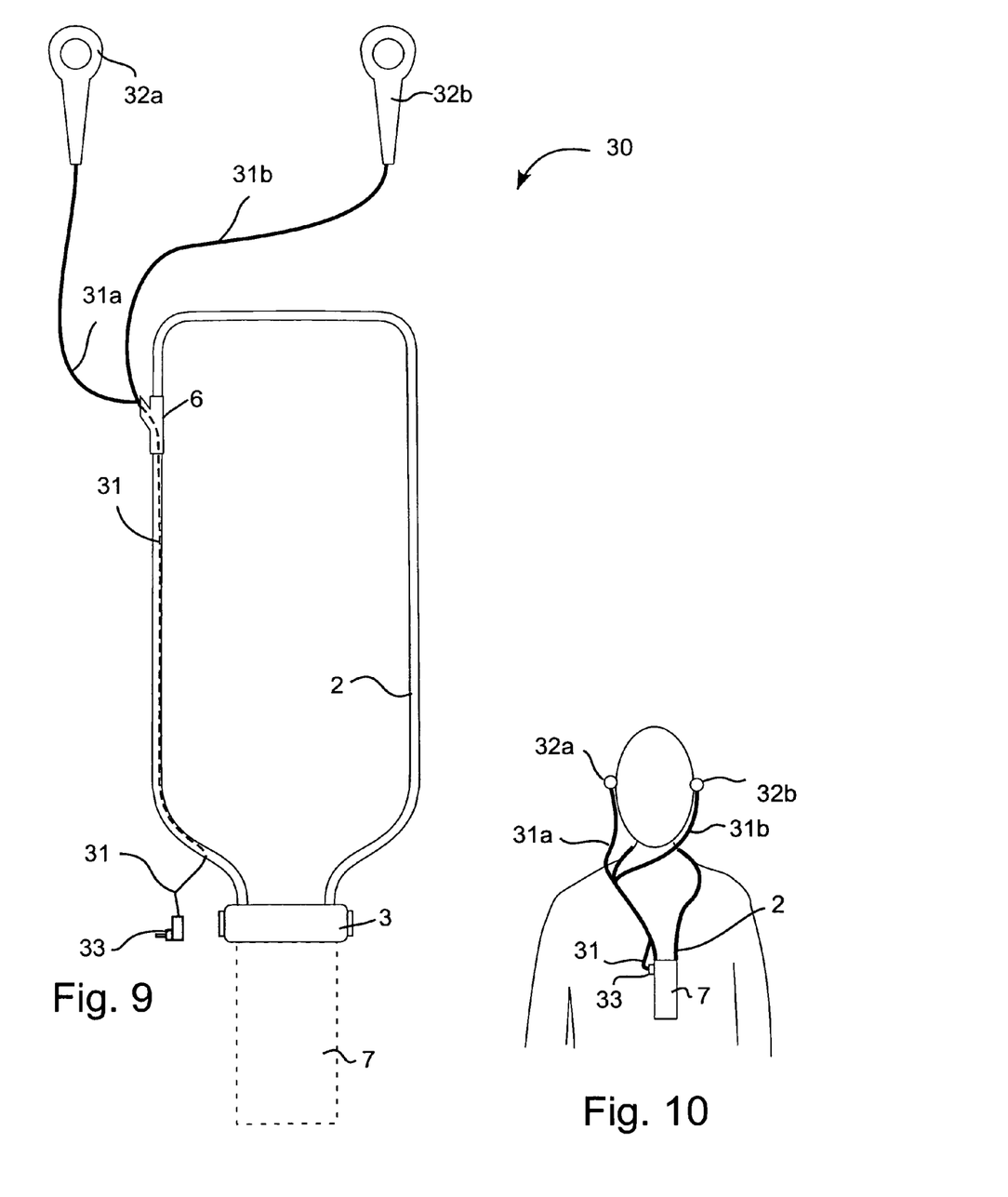
FIG. 9 shows a neck strap according to still further embodiments of the invention in an active position where a set of earphones are in use.
FIG. 10 schematically shows a person wearing the neck strap of FIG. 9.
Figures 11, 12:
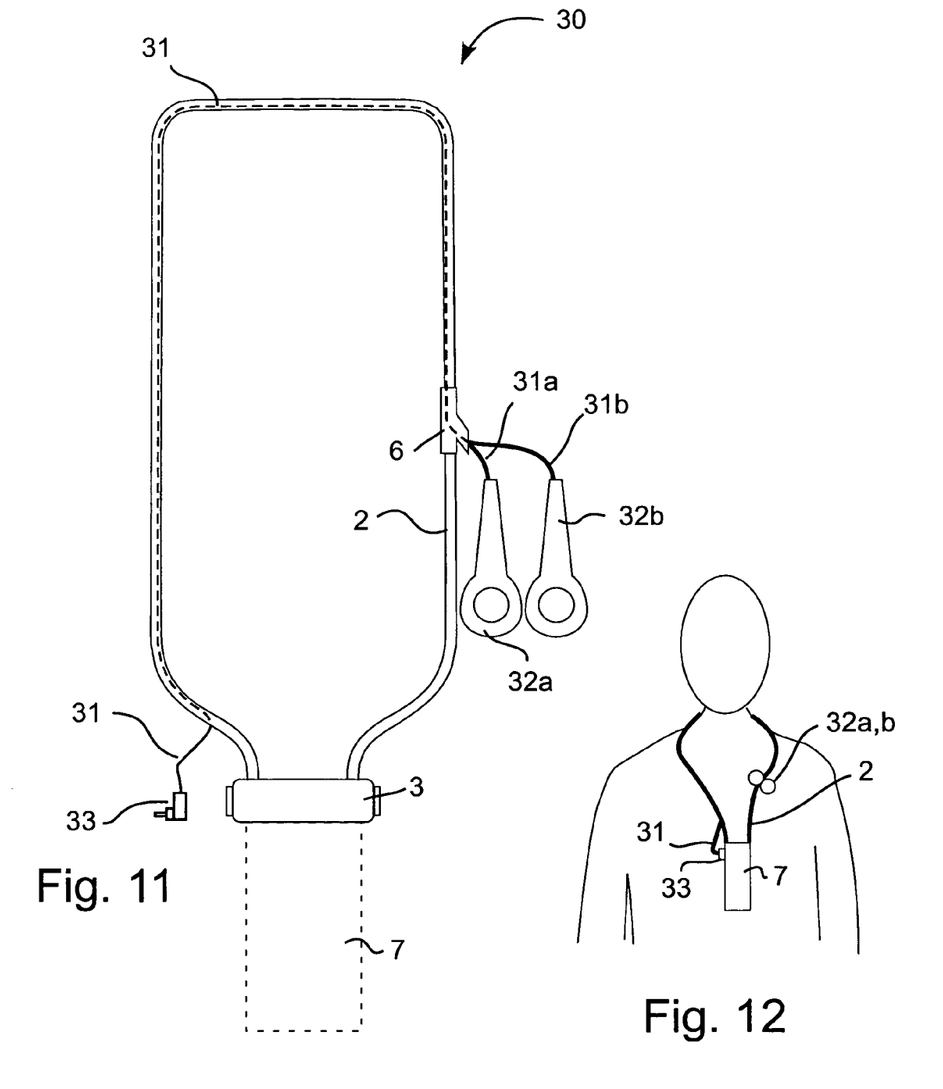
FIG. 11 shows a neck strap according to further embodiments of the invention in a "storage" position where the earphone cables are stored in the neck strap.
FIG. 12 schematically shows a person wearing the neck strap of FIG. 11.

When the user is using the earphones see FIG. 10, the sliding element has been slid along the flexible loop until it is arranged on the left side of the neck strap (with reference to FIGS. 9-12). When the user wishes to put the earphones in the "storage" position see FIG. 12, the sliding element 6 is slid along the flexible loop 2 until it is arranged on the right side of the neck strap 30 (with reference to FIGS. 9-12).

In this embodiment 30, the dimensions of the recess 12 in the flexible loop 2 could be chosen such that they match the standard dimensions of a set of earphone cables.

The above-described embodiments are just three examples of many different possible embodiments of neck straps according to the invention.

Furthermore, the above embodiments all show earphones and earphone cables. However, many other types of accessories, one example being a microphone, could also be arranged in a similar manner. In some cases, accessories, for example a microphone, could be incorporated at a fixed location on the flexible strap.

Furthermore, while some embodiments include a recess on the flexible strap in which the earphone cable may be arranged, other forms of securing element are also possible. For example, instead of a channel on the flexible loop, the accessory cable can be equipped with a channel which engages with a protrusion on the flexible strap. Alternatively, a recess in the flexible strap may be engageable with a corresponding protrusion on the cable. As another example, the flexible loop could be arranged with a channel along a section of the flexible loop which can opened and closed. The accessory cable can be arranged in the channel when it is open after which the channel can be closed with for example a zipper, thereby holding the accessory cable within the channel.

In addition, some embodiments include a sliding element which may make it easier for the user to engage and/or disengage the accessory cable with the flexible loop. However, it would also be possible to have an embodiment without the sliding element. In this case, the user would manually engage the accessory cable with the flexible loop.

It should also be mentioned that the term "mobile electronic device" as used in this specification includes portable radio communication equipment as well as many other portable electronic devices such as MP3 players, audio cassette players, CD players, DVD players, video cameras, digital cameras, or the like. Portable radio communication equipment includes devices such as mobile telephones, pagers, communicators, i.e. electronic organizers, smartphones or the like.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A neck strap for a mobile electronic device, comprising:
   a flexible loop arrangeable around the neck of a user; and
   a connector configured to connect the flexible loop to the mobile electronic device;
   wherein at least one section of the flexible loop includes at least one securing element configured to secure a cable to the at least one section of the flexible loop; and
   wherein the neck strap further comprises a sliding element slideably arranged on the flexible loop, whereby a motion of the sliding element in a first direction along the flexible loop engages the cable with the securing element and whereby a motion of the sliding element in a second direction along the flexible loop, opposite the first direction, disengages the cable from the securing element;
   wherein the at least one securing element comprises a recess in the at least one section of the flexible loop which is engageable with the cable; and
   wherein the recess is essentially C-shaped and has an inner diameter which has essentially the same as an outer diameter of the cable.

2. A neck strap according to claim 1, wherein the recess is engageable with a corresponding protrusion on the cable.

3. A neck strap according to claim 1, wherein the securing element is integrated into the flexible loop along the at least one section.

4. A neck strap according to claim 1, wherein the sliding element includes a first channel arrangeable on the flexible loop and a second channel which is engageable with the cable, wherein the first channel and the second channel merge at an angle.

5. A neck strap according to claim 1, wherein the cable further comprises at least one earphone at an end thereof, whereby an end of the cable opposite the earphone is connected to the connector, and at least a portion of the cable is arranged within the neck strap.

6. A neck strap according to claim 1, wherein the mobile electronic device is a mobile radio terminal.

7. A neck strap according to claim 1, wherein the sliding element comprises a channel through which the cable passes.

8. A neck strap for a mobile electronic device, comprising:
   a flexible loop, wherein at least one section of the flexible loop comprises an elongated recess therein that is engageable with a cable to secure the cable to the at least one section of the flexible loop;
   a connector configured to connect the flexible loop to the mobile electronic device; and
   a sliding element slideably arranged on the flexible loop and including a first channel engageable on the flexible loop and a second channel which is engageable with the cable, wherein the first channel and the second channel merge at an angle, whereby a motion of the sliding element in a first direction along the flexible loop urges the cable into the elongated recess and a motion of said sliding element in a second direction along the flexible loop, opposite the first direction, urges the cable out of the elongated recess.

* * * * *